2 Sheets—Sheet 1.
D. M. CHURCH.
RAILWAY SWITCH.
No. 11,404. Reissued Feb. 13, 1894.
Fig. 1,
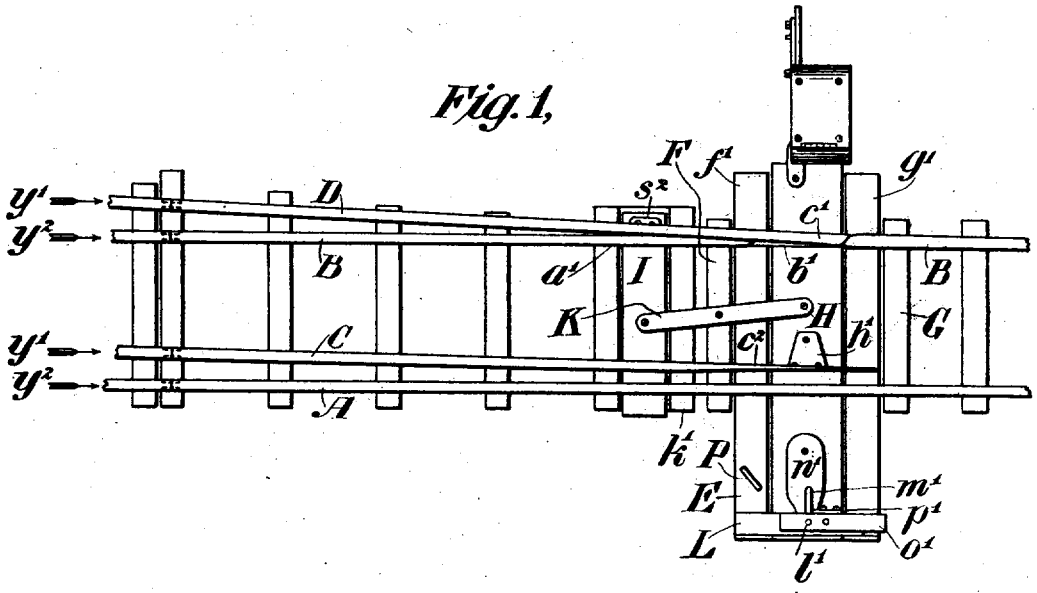
Fig. 2,
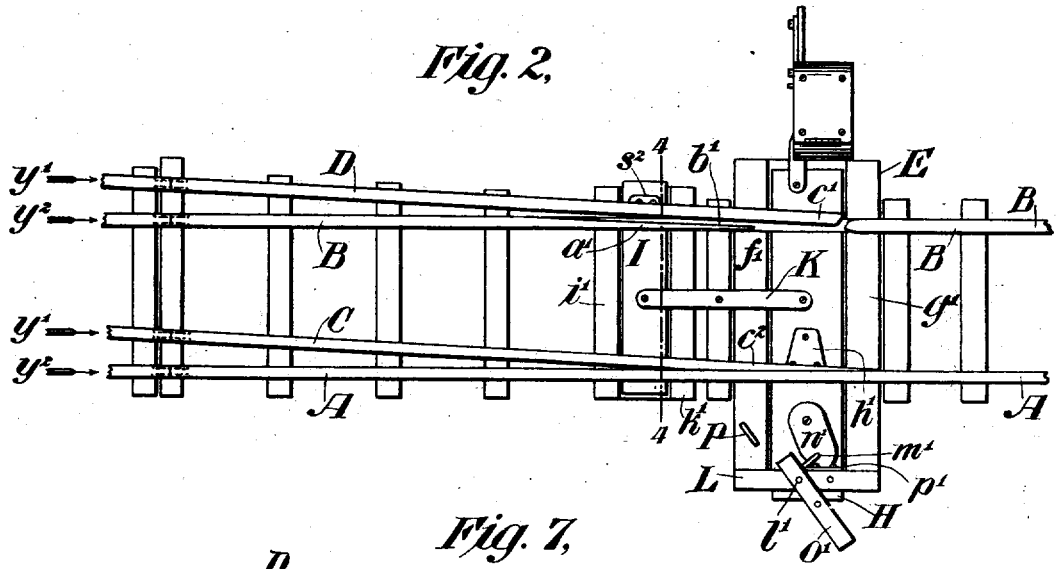
Fig. 7,
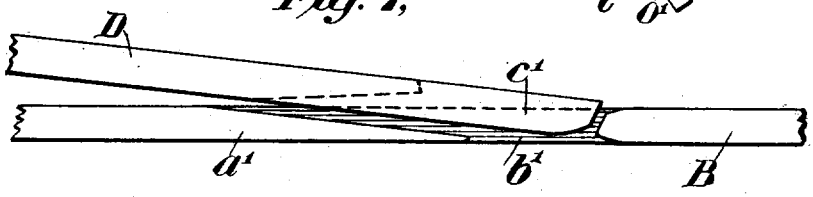
Witnesses:-
D. H. Haymond
M. E. Foster.
Inventor:
D. M. Church
By atty J. N. McGuire
THE NATIONAL LITHOGRAPHING COMPANY, WASHINGTON, D. C.

D. M. CHURCH.

RAILWAY SWITCH.

No. 11,404. Reissued Feb. 13, 1894.

Witnesses:-

D. H. Haynord

M. E. Kirten

Inventor:-

D. M. Church

By atty

J. N. McIntire

THE NATIONAL LITHOGRAPHING COMPANY,
WASHINGTON, D. C.

UNITED STATES PATENT OFFICE.

DWIGHT M. CHURCH, OF WILLIMANTIC, CONNECTICUT, ASSIGNOR OF PART INTEREST TO ARTHUR CHARLES ANDREW, OF SAME PLACE, AND EDGAR BENJAMIN FOSS, OF BAY CITY, MICHIGAN.

RAILWAY-SWITCH.

SPECIFICATION forming part of Reissued Letters Patent No. 11,404, dated February 13, 1894.

Original No. 488,161, dated December 13, 1892. Application for reissue filed December 26, 1893. Serial No. 494,806.

*To all whom it may concern:*

Be it known that I, DWIGHT M. CHURCH, of Willimantic, in the county of Windham and State of Connecticut, have invented a certain new and useful Improvement in Railway-Switches; and I do hereby declare that the following is a full, clear, and exact description of the same, reference being had to the accompanying drawings, forming part of this specification.

My invention relates more particularly to that type of railway switches in which two movable switch-rails are employed in connection with the main rails, or track, and it consists in certain novel combinations of devices, which will be hereinafter fully explained, and which will be particularly pointed out and defined in the claims of this specification.

Figure 3:
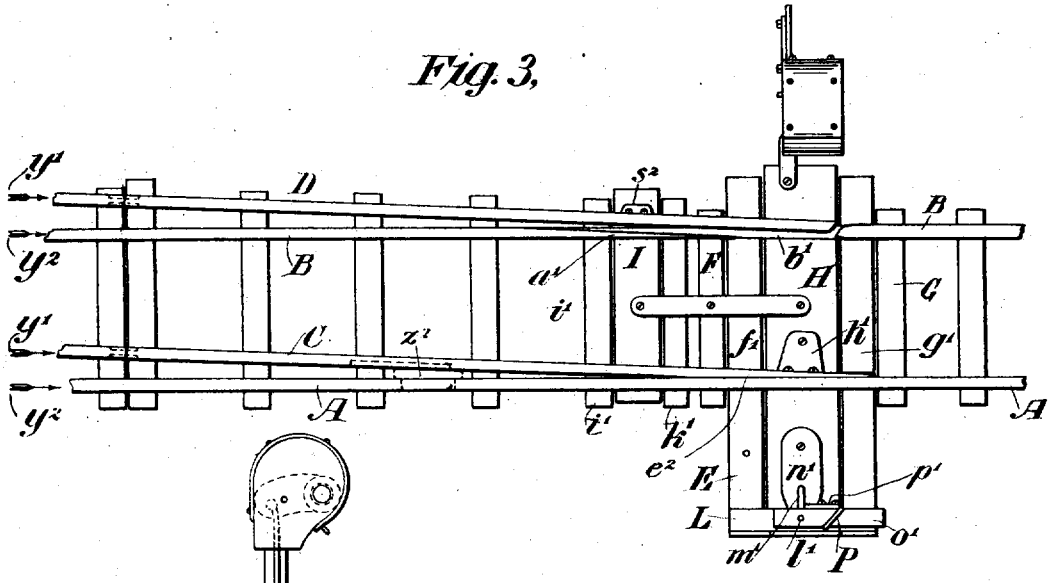
Figure 4:
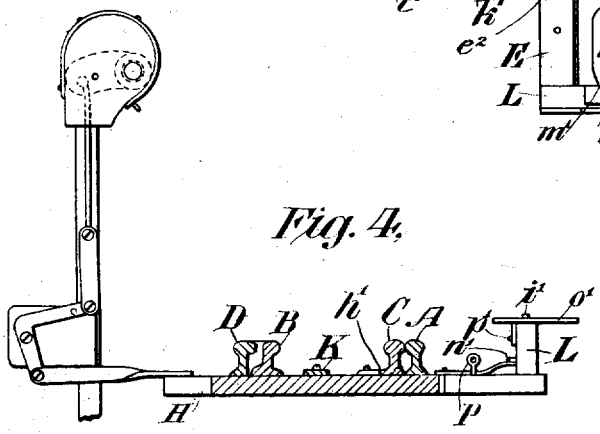
Figure 6:
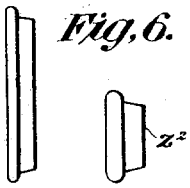
Figure 5:
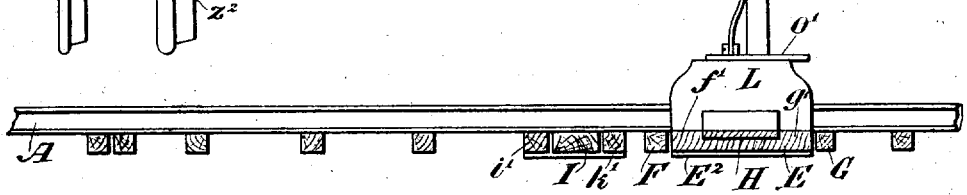
Figure 8:
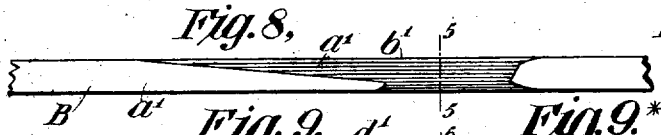
Figure 8:
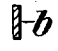
Figure 9:
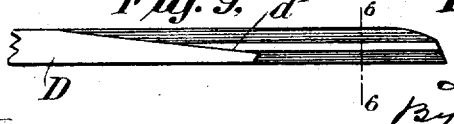
Figure 9:
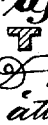

In the accompanying drawings, Figure 1 illustrates a plan view of a portion of a main railway-track, and the switch-rails used in connection therewith, the parts being in their proper positions when the main track is continuous. Fig. 2 is a view similar to Fig. 1, but showing the different parts in the position they will assume when the switch is open; or when the siding is in connection with the main track. Fig. 3 is a similar view to Fig. 1, but showing the different parts in their proper positions after the switch has been opened by means from the locomotive, and also showing such means in proper position to close the switch or make the main track continuous. Fig. 4 is a transverse section through the line 4, 4, of Fig. 2. Fig. 5 is an edge view of the parts in the position shown in Fig. 2. Fig. 6, represents edge views of one of the train traction-wheels, and a thick flanged wheel for operating the switch-rails for the purpose of illustrating the relative widths of the flanges of the two wheels; Fig. 7 a plan enlarged, of part of the outer switch-rail and of its adjacent main rail; Fig. 8, a similar plan of such main rail; Fig. 8*, a cross-section through line 5, 5, of Fig. 8; Fig. 9 an under side view of that portion of the switch-rail shown in Fig. 7; and Fig. 9* a cross section through the line 6, 6, of Fig. 9.

Similar letters represent like parts in all the figures.

A and B are the two main stationary rails of a railway-track, and C, D, are the two switch-rails, one of which C is pivoted between the rails A and B, and the other D is pivoted outside of the rail B. When the rails are in the position shown in Fig. 1, the switch is closed and the main track is continuous with a portion of the inner edge of rail D at and near its free end continuous with the inner edge of the main rail B, and to meet this requirement a small portion of the rail B is cut away, as shown at $a'$, and $b'$, the cut-away portion at $a'$ being a diagonal cut from the outer to the inner side of the head and down to the foot of the rail B, and the cut-away portion $b'$ extending entirely across the rail B down to but not through the foot of the same, to enable the head of the rail D to cross the foot of the rail B, and a small portion $c'$ of rail D to be continuous with the inner edge of the rail B. A portion of the foot of the rail D is also cut away, as at $d'$, to enable said rail to ride over and rest upon the foot of rail B, and to assume the position shown in Fig. 1. The outer edge of the rail C at and near its free end is also cut away diagonally, as shown at $c^2$, said end tapering off gradually to nearly a chisel edge, to enable such cut-away edge to abut against and conform with the inner edge of the rail A, and to constitute a continuous inner edge of the rails C and A, when the parts are in the positions represented in Fig. 2.

E is a plate, extending transversely across and under the rails A, B, and under the ends of the switch-rails C, D; and inclosed and adapted to slide between two parallel, fixed, sleeper-bars, F and G. The plate, E is provided with parallel raised flanges, $f'$, and $g'$, forming guides, between which a slide H is adapted to play. To this slide H the rail C, near its free end, is secured, as shown at $h'$.

I is a sliding plate, or block, extending under the rails, A, B, C, D, a little farther back than the slide H, working between fixed guides $i'$, $k'$, similar to F, G, and parallel with said slide H.

K is a lever of the first order, pivoted upon a fixed fulcrum between the slides H and I, with the ends of said lever pivoted, respectively, to said slides.

The above construction is for the purpose of causing the slide I to move in the opposite direction from the slide H.

The switch-rail D is secured to the slide I at the point $s^2$ upon said slide, so that said rail D will be separated from the rail B, when the rail C is in contact with the rail A; as shown in Figs. 2 and 3.

From the above it will be seen that when the rail C is drawn against the rail A by the slide H, the slide I will move in the opposite direction from said slide H, causing the rail D to separate from the rail B, as shown in Figs. 2 and 3. The main track will then be closed, the switch will be open and in proper position for trains running onto the switch, or siding; but if the rail C be moved away from the rail A, by the slide H, the slide I will be forced by the lever K to move the switch rail D toward and against the rail B, as shown in Fig. 1, and the switch will then be closed, while the main track will be continuous and open for moving trains.

L is a standard, extending upward from the slide E, outside of the rails, and yoked over the slide H. Extending vertically through said standard, and over the slide H is a rock-shaft $l'$, having a crank $m'$ at its lower end, which engages with a swinging arm $n'$ of the slide H. The upper end of the shaft $l'$ is provided with a crank $o'$, by which said shaft may be rocked, and consequently the crank $m'$ may be also rocked, and the slide H moved back and forth through the connecting swinging arm $n'$. A stop $p'$ limits the movement of the crank $o'$, and consequently of the slide H, and its connected parts.

P is a pin which is adapted to pass through a hole in the slide E into a fixed plate, or block, $E^2$, beneath the same, (see Fig. 5,) by which said slide may be firmly locked, when the slide H and its connected parts are to be moved, as above described. When however, it be desired to have the switch operated from a device on a train, or locomotive moving in the direction of the arrow $y'$ or $y^2$, the pin P is removed from the hole in the slide E and the plate beneath, and inserted through a hole in the crank O'. If the rails and other parts then be in the positions shown in Fig. 1—that is, with the main track open, and the switch, or siding closed to moving trains—the engineer, on the train moving on the side tracks C, D in the direction of the arrows $y'$, can lower a thick flanged wheel—such as $z^2$ in Fig. 6—between the tracks B and D, and the flange of said wheel will spread the rail D outward, and as the slide H will be keyed to the slide E by the pin P, and said slide E is free to move, said two slides H and E will move together, through the instrumentality of the slide I and lever K, and the switch-rail C will be drawn against the rail A and the parts will be in the positions shown in Figs. 3 and 4. If the tracks and other devices be in the positions shown in Fig. 3, and a train be moving along on the main track, or rails, A, B, in the direction of the arrows $y^2$, the engineer may lower the thick flanged wheel $z^2$ (see dotted lines in Fig. 3), between the rails A and C, and the flange of said wheel will separate the rail C from the rail A; and, through the instrumentality of the slides H and E and lever K, slide I will draw the rail D close to the rail B, closing up its cut-away portions $a'$ and $b'$, and thus making it a continuous main track for trains, as shown in Fig. 1.

One object of having the part E arranged to slide, when not locked to $E^2$, and when so slid to carry with it the slide H (which in such case is locked, or pinned fast to it), is that when not locked together, slide H may be easily worked by hand, if needed; but when locked together, and slide E is not fastened to the bed, only a passing train or the small thick-flanged wheel on the locomotive will move both the connected slides together. The arrangement shown, of the double slides, also better protects them from snow and ice, and allows them to work smoother.

What I claim as new, and desire to secure by Letters Patent, is—

1. In a railway switch, the combination, with two switch-rails, one of which is pivoted between the main rails and the other of which is pivoted outside of them, of the slides to which the said switch-rails, are, respectively, connected; and a lever having a fixed fulcrum intermediate of said slides, and having its ends coupled, respectively, to said slides; all substantially as and for the purposes set forth.

2. In a railway switch the combination of the following named instrumentalities:—a main rail A; a rail B, having the cut-aways $a'$, $b'$; the switch-rail C, cut as at $c^2$; the switch-rail D, cut away as at $d'$; the slides, to which said switch-rails have their ends, respectively, connected; and a lever, fulcrumed intermediately of said slides and having its ends coupled, respectively, to them; the whole arranged and operating substantially as and for the purposes set forth.

3. In a railway switch, the following named instrumentalities, arranged and operating together as hereinbefore described:—the slide H, provided with suitable guide-ways; the slide E, having a standard yoked, or extending, over the slide H; the rock-shaft $l'$; cranks

*m'* and *o'*; the swinging arm *n'*; the slide I; the lever K, having its ends connected, respectively, to slides H and I; and the two switch-rails C, and D, having their ends, respectively, secured to the said slides.

4. In combination with the two switch-rails, simultaneously actuated to move one toward and one away from its respective adjacent main rail, a signal-lever having connections with said switch rails; substantially as described.

In witness whereof I have hereunto set my hand this 21st day of November, 1893.

DWIGHT M. CHURCH.

In presence of—
R. A. McKay,
A. B. Lennox.